US008213976B2

(12) United States Patent
Horio et al.

(10) Patent No.: US 8,213,976 B2
(45) Date of Patent: Jul. 3, 2012

(54) COMMUNICATING SYSTEM, SERVER, COMMUNICATING TERMINAL, AND RECORDING MEDIUM

(75) Inventors: Kenichi Horio, Kawasaki (JP); Takashi Ohno, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 12/561,033

(22) Filed: Sep. 16, 2009

(65) Prior Publication Data
US 2010/0009708 A1 Jan. 14, 2010

Related U.S. Application Data

(63) Continuation of application No. PCT/JP2007/057124, filed on Mar. 30, 2007.

(51) Int. Cl.
*H04B 7/00* (2006.01)
(52) U.S. Cl. ........ 455/518; 455/519; 455/412.1; 455/416; 455/41.2; 455/3.05; 455/90.2; 379/202.01
(58) Field of Classification Search .......... 455/518, 455/519, 412.1, 416, 418, 466, 41.2, 3.05, 455/90.2; 370/260, 261, 270, 276, 352, 389, 370/395.2; 379/202.01, 88.17
See application file for complete search history.

(56) References Cited

U.S. PATENT DOCUMENTS

| | | | |
|---|---|---|---|
| 2002/0150091 A1 | 10/2002 | Lopponen et al. | |
| 2002/0150092 A1 | 10/2002 | Bontempi et al. | |
| 2004/0120474 A1 | 6/2004 | Lopponen et al. | |
| 2005/0190740 A1 | 9/2005 | Zhao et al. | |
| 2006/0154683 A1* | 7/2006 | Umezawa et al. | 455/518 |
| 2006/0193416 A1* | 8/2006 | Horio et al. | 375/371 |
| 2006/0215641 A1 | 9/2006 | Kitagawa et al. | |
| 2007/0133435 A1* | 6/2007 | Eneroth et al. | 370/260 |

FOREIGN PATENT DOCUMENTS

| | | |
|---|---|---|
| JP | A 2000-68926 | 3/2000 |
| JP | A 2004-535097 | 11/2004 |
| JP | A 2006-180143 | 7/2006 |
| JP | A 2006-279223 | 10/2006 |
| JP | A 2007-134829 | 5/2007 |
| WO | WO 02/085051 A1 | 10/2002 |
| WO | WO 03/036801 | 5/2003 |
| WO | WO 2005/043944 | 5/2005 |

OTHER PUBLICATIONS

Open Mobile Alliance, "Push to Talk Over Cellular (PoC)—Architecture," Open Mobile Alliance OMA-AD_PoC-V2_0-20070326-D, (2005), Retrieved on Apr. 4, 2011 from http://member.openmobilealliance.org/ftp/public_documents/COM/COM-POC/Permanent_documents/OMA-AD-PoC-V2_0-20070326-D.zip.
Extended European Search Report issued on Apr. 15, 2011 in corresponding European Application No. 07740560.3.

* cited by examiner

*Primary Examiner* — Shaima Q Aminzay
(74) *Attorney, Agent, or Firm* — Greer, Burns & Crain, Ltd.

(57) ABSTRACT

A communicating system includes: a plurality of communicating system terminal including a communication unit that transmits and receives audio or video data and a reproducing unit that reproduces the data received by the communication unit; and a server including an administering unit that administers the plurality of communicating terminals as a communication group, an approving unit that approves the transmission of the data by one of the communicating terminals of the communication group, a receiving unit that receives the data transmitted by the one of the communicating terminals, and a transmitting unit that transmits the data received by the receiving unit to the other communicating terminals of the communication group.

12 Claims, 14 Drawing Sheets

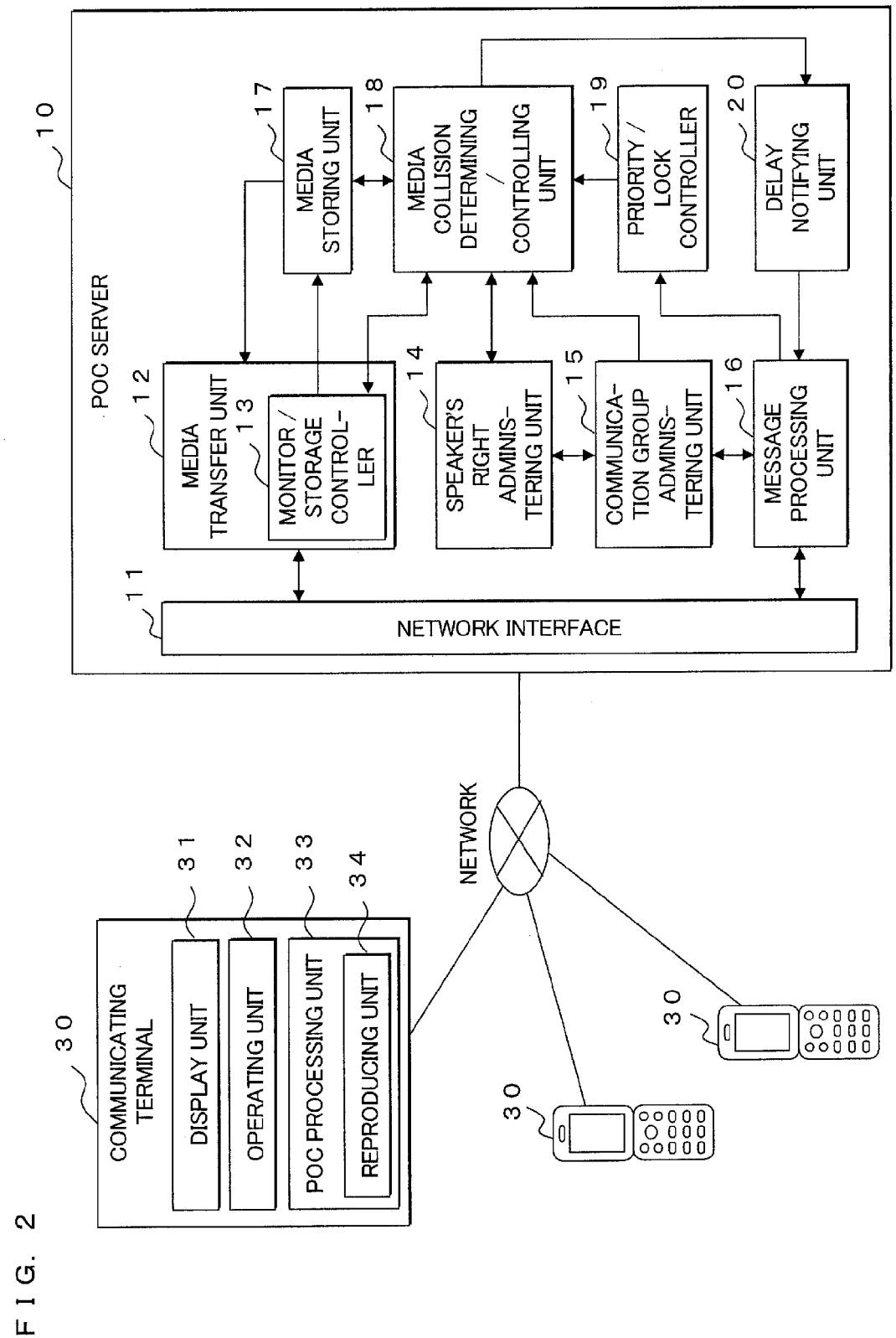

F I G. 3

MEDIA INFORMATION ADMINISTERING TABLE

| UNRE-CEIVED USER ID | No. | COMMUNI-CATION GROUP ID | SPEAKER ID | SPEECH START-ING TIME | SPEECH ENDING TIME | DURA-TION OF SPEECH | TIME POINTS | DURA-TION OF TRANS-MISSION | PRIORITY ORDER | MEDIA DATA STORAGE ADDRESS |
|---|---|---|---|---|---|---|---|---|---|---|
| User1 | 1 | PoC1 | User101 | 06/11/16 12:18 | 06/11/16 12:23 | 5 MINUTES | — | 0 MINUTES | 1 | ADDRESS 1 |
|  | 2 | PoC2 | User102 | 06/11/16 12:23 | — | 3 MINUTES | — | 0 MINUTES | 2 | ADDRESS 2 |
| User2 | 1 | PoC1 | User101 | 06/11/16 12:18 | 06/11/16 12:23 | 5 MINUTES | 06/11/16 12:25 | 1 MINUTES | 1 | ADDRESS 1 |
| ⋯ | ⋯ | ⋯ | ⋯ | ⋯ | ⋯ | ⋯ | ⋯ | ⋯ | ⋯ | ⋯ |

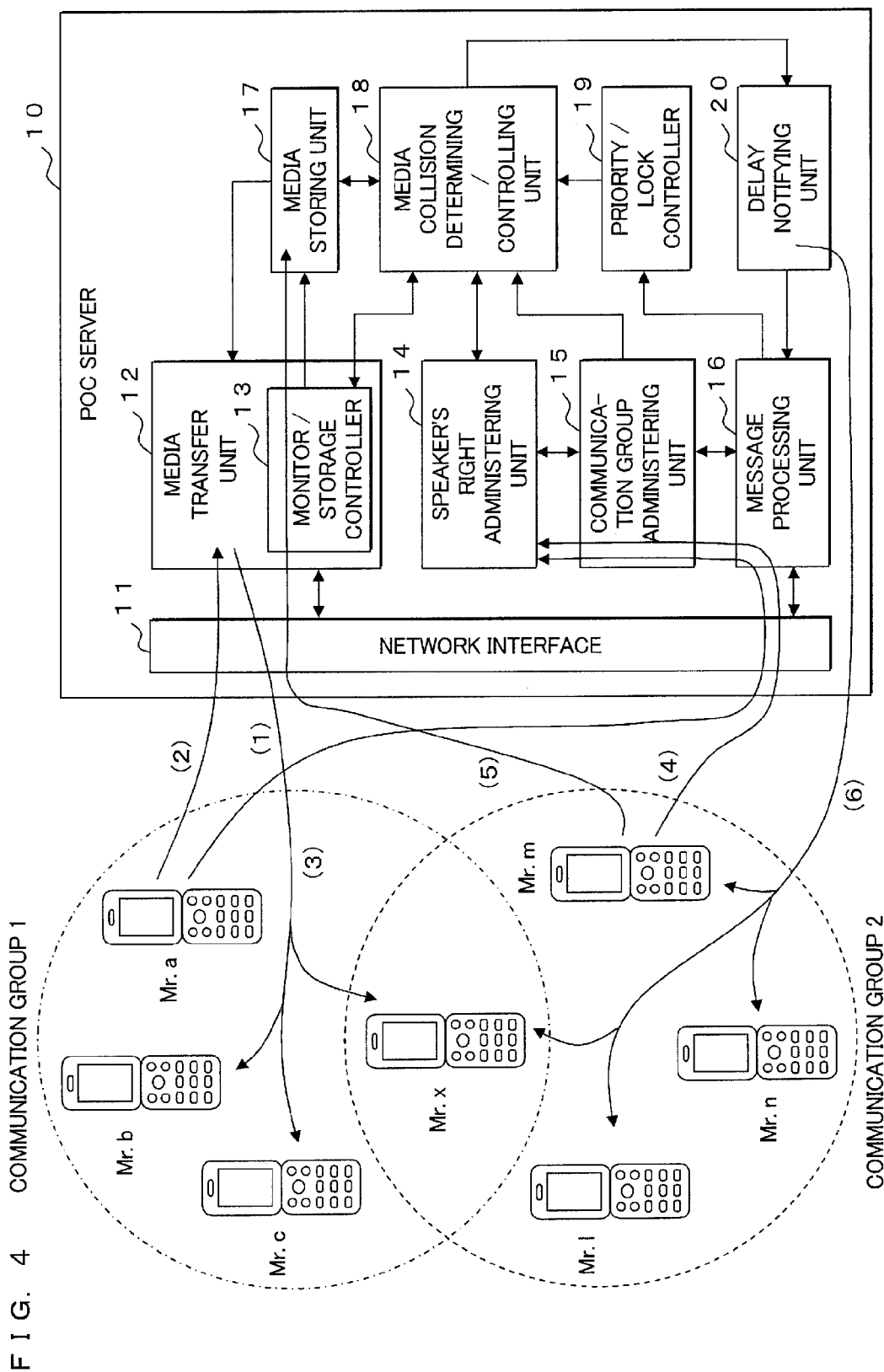
F I G. 4

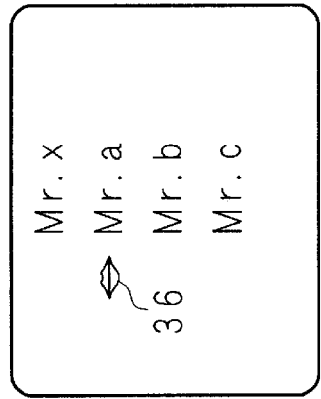
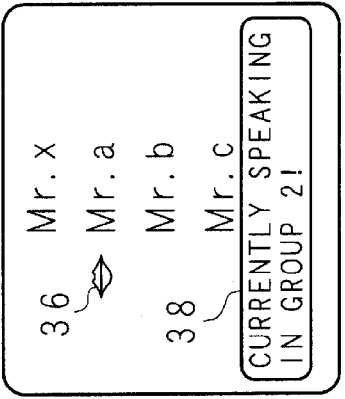
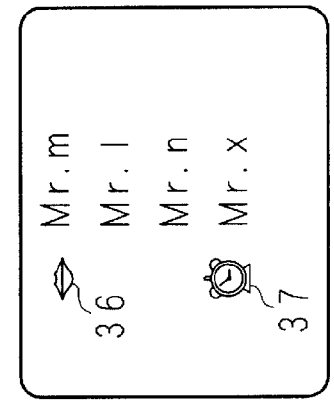
FIG. 6A
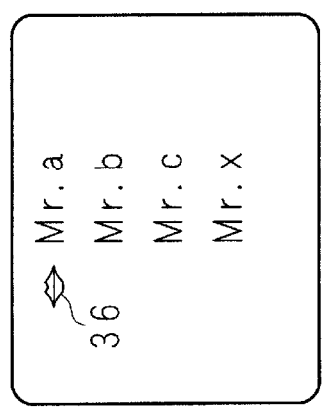
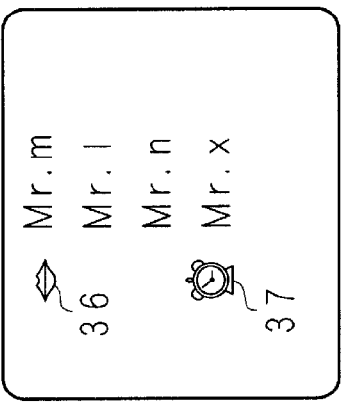
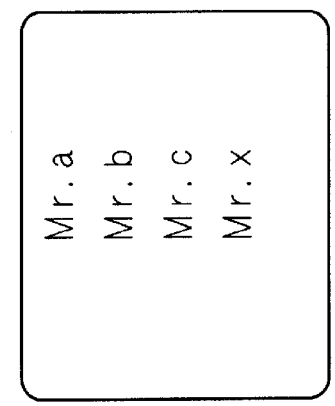
FIG. 6B
FIG. 6C

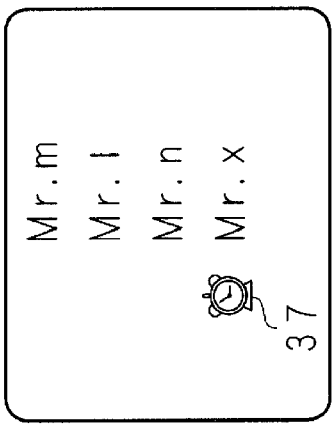
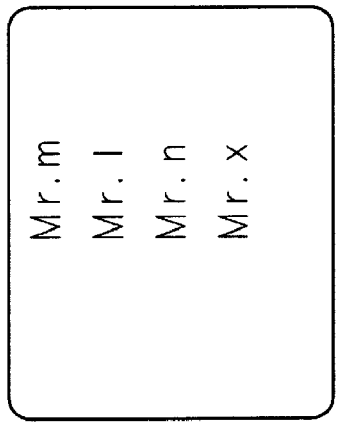
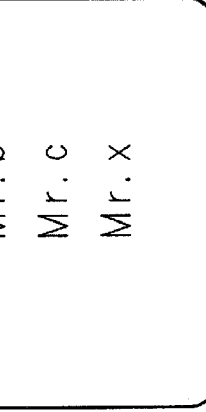
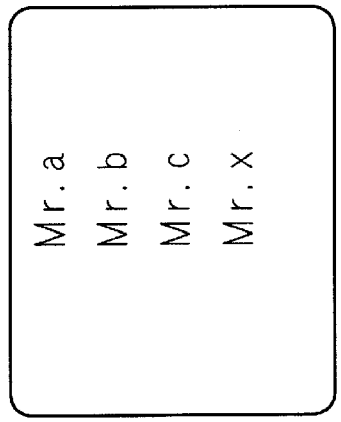
F I G. 7A
F I G. 7B

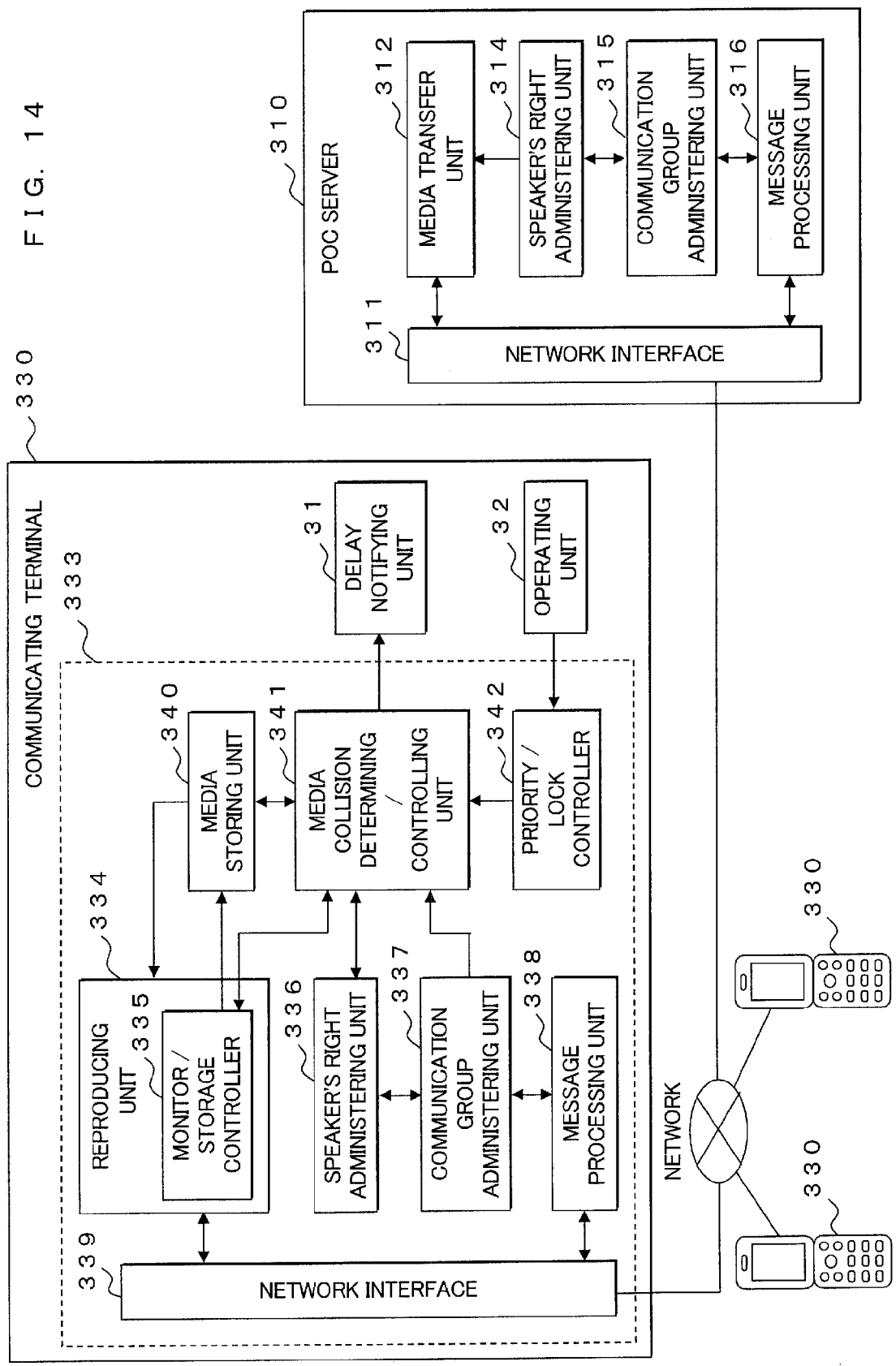

COMMUNICATING SYSTEM, SERVER, COMMUNICATING TERMINAL, AND RECORDING MEDIUM

CROSS-REFERENCE TO RELATED APPLICATIONS

This application is a continuation, filed under U.S.C. §111(a), of PCT International Application No. PCT/JP2007/057124 which has an international filing date of Mar. 30, 2007 and designated the United States of America.

FIELD

The embodiments discussed herein is related to a communicating system wherein a plurality of communicating terminal, such as mobile telephones, transmit and receive by way of a server.

BACKGROUND

As a communicating system wherein communicating terminals, such as mobile telephones, are used, the PoC (Push-to-talk over Cellular) system has been commercially made available. The PoC system is advantageous in that a user with a communicating terminal performs audio transmission to other users at the same time, namely one-to-many communication is performed, and is attracting attention as a handy communication tool used by a plurality of different groups of users. In the PoC system, however, it is not possible for two or more users to perform the audio transmission at the same time, and the user must push a button for speech provided in the communicating terminal and obtains a speech right before he/she starts to talk. The audio of the speech, which is obtained until the pushed button for speech is released so that the speech right is resigned, is transmitted to the other communicating terminals simultaneously, and the other users simultaneously listen to them. The other users can not obtain the speech right while the one user is speaking, which makes it necessary for the plurality of users to transfer to one another for the speech right during the communication in the PoC system.

The PoC system is provided with a server for the administration of the speech right and the transmission and reception of the audio data. The server approves the speech by giving the speech right to any of the communicating terminals when the speech right is thereby requested, and receives the audio data transmitted from the communicating terminal allowed to speak, and transmits the received audio data to the other communicating terminals simultanously. The server is adapted to simultaneously transmit the audio data to the communicating terminals included in a communication group registered in advance, and is responsible for processes associated with the administration of the communication group.

According to the Japanese Laid-open Patent Publication No. 2006-180143, a communicating system is discussed. With the communicating system, a mobile terminal makes an appointment for the speaker's right in a PoC server, and the speaker's right is given on a first-come first-served basis after it is released, so that the user conveniently speak. In the communicating system, the PoC server sets an appointment status of the speaker's right in an administering table, and the appointment is registered or cancelled by a notice sent by pushing a PoC key provided on the mobile terminal. The mobile terminal displays the appointments for the speaker's right in the PoC server and notifies information indicating that another appointment is made using a vibrator when the speaker's right is retained. The PoC server allocates the speaker's right to the mobile terminals in order of the appointment registrations, and releases the speaker's right in a case where there is no response from the user when the speaker's right is allocated.

SUMMARY

According to an aspect of the embodiments, a communicating system includes: a plurality of communicating system terminal including a communication unit that transmits and receives audio or video data and a reproducing unit that reproduces the data received by the communication unit; and a server including an administering unit that administers the plurality of communicating terminals as a communication group, an approving unit that approves the transmission of the data by one of the communicating terminals of the communication group, a receiving unit that receives the data transmitted by the one of the communicating terminals, and a transmitting unit that transmits the data received by the receiving unit to the other communicating terminals of the communication group, wherein the communicating terminal can be engaged in a plurality of communication groups, and the communicating system further comprises: a determining unit that determines priority orders of multiple pieces of data, in a case where multiple pieces of data to be reproduced by the communicating terminal engaged in a plurality of communication groups is received, and the multiple pieces of data is data associated with the different communication groups; a storing unit for storing data; and a data controlling unit that processes data having a highest priority according to a determination result obtained by the determining unit and stores the data having a lower priority in the storing unit, wherein the data controlling unit processes the data having the lower priority after the data having the highest priority is processed.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

BRIEF DESCRIPTION OF THE DRAWINGS

FIG. 2 is a block diagram illustrating an example of the communicating system according to the first embodiment.

FIG. 3 is a schematic illustration of an example of a media information administering table.

FIG. 4 is a schematic illustration of a communication example in the communicating system according to the first embodiment.

FIGS. 6A, 6B and 6C are illustrations of display examples in a display unit of a communicating terminal in the communication example.

FIGS. 7A and 7B are illustrations of the display examples in the display unit of the communicating terminal in the communication example.

FIG. 14 is a block diagram illustrating an example of a communicating system according to a second embodiment.

DESCRIPTION OF EMBODIMENTS

Embodiment 1

Figure 1:
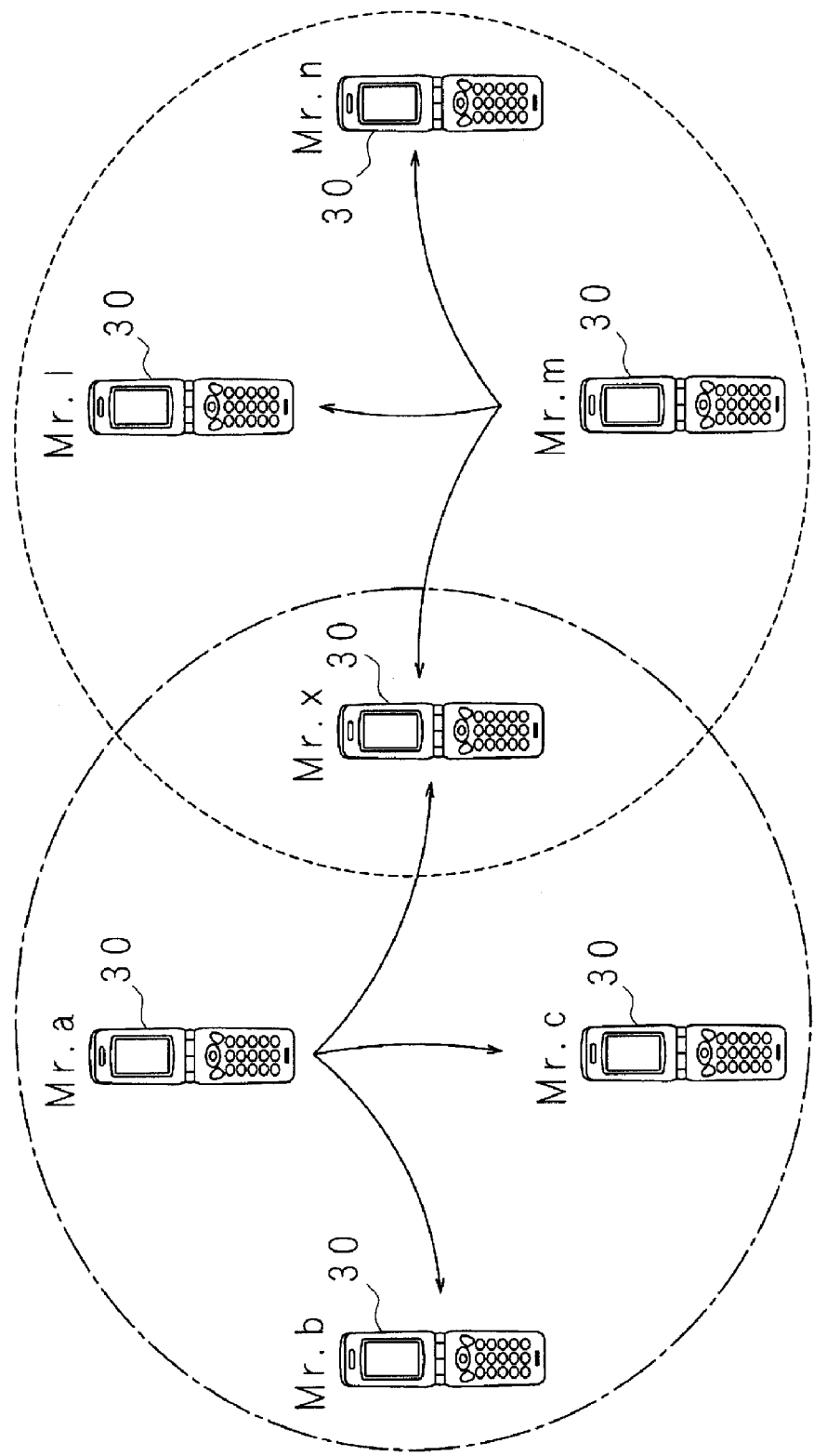
FIG. 1 is a schematic illustration of a one-to-many communication in communication groups in which a communicating system according to a first embodiment is used.

Hereinafter, the present embodiment is described in detail referring to the drawings illustrating embodiments thereof. FIG. 1 is a schematic illustration for describing a one-to-many communication in communication groups in which a communicating system according to a first embodiment is used. The communicating system according to the present embodiment is a system having a PoC-compliant communication feature. In the PoC system, a one-to-many communication is performed among a plurality of communicating terminals 30 participating in a communication group. In the example illustrated in the drawing, three communicating terminals 30 used by Messrs. a, b and c participate in a communication group 1, and three communicating terminals 30 used by Messrs. l, m and n participate in a communication group 2. A communicating terminal 30 used by Mr. x participates in both of the communication group 1 and the communication group 2. In the communicating system according to the present embodiment, one communicating terminal 30 can participate in a plurality of communication groups to thereby perform a one-to-many communication according to the PoC system in the plurality of communication groups.

In the one-to-many communication according to the PoC system, only one user can speak, in other words, there is only one speaker's right in a communication group. For example, when Mr. a in the communication group 1 obtains the speaker's right and speaks, Messrs. b, c and x participating in the communication group 1 can simultaneously listen to the speech by Mr. a. While Mr. a is speaking, the other users are not allowed to speak. Another user is allowed to speak only after the speech by Mr. a is over and the speaker's right is released and then he/she obtains the speaker's right. The same thing is true of the communication group 2. However, Mr. m can obtain the speaker's right and speak while Mr. a is speaking because each communication group has one speaker's right.

When Mr. a in the communication group 1 and Mr. m in the communication group 2 speak at the same time, Mr. x participating in the two communication groups needs to listen to both of the speeches by Messrs. a and m. In the conventional communicating system, the problems of which are already described earlier, the priority orders appended in advance to the respective communication groups are checked, and the speeches from the low-priority communication group are discarded. For example, in a case where the priority of the communication group 1 is higher than that of the communication group 2 in the illustrated example, Mr. x can listen to the speech by Mr. a of the two simultaneous speeches, while missing the speech by Mr. m. For example, the priority orders of the respective communication groups can be set in advance by Mr. x when he operates his communicating terminal 30.

In contrast, in the communicating system according to the present embodiment, media data of the speech from a highest-priority communication group is transmitted to the communicating terminal 30 used by Mr. x and reproduced therein, while the media data of the speech from a lower-priority communication group is temporarily stored, and the stored media data is reproduced after the reproduction of the media data of the highest-priority communication group is completed. Then, Mr. x can listen to the speech by Mr. m after the speech by Mr. a is over. In the communicating system according to the first embodiment, the determination of the priority orders, and the transmission, storage and the like of the media data are handled by a PoC server 10 (illustrated in FIG. 2) which is in charge of the administration, control and the like of the PoC system.

FIG. 2 is a block diagram illustrating an example of the communicating system according to the first embodiment. The communicating system according to the present embodiment includes the PoC server 10 and the plurality of communicating terminals 30, and these devices are connected to one another by way of networks such as the LAN (Local Area Network) and the Internet so that data is transmitted and received among them. The networks may be either of wire networks or wireless networks, or wire and wireless networks may be mixedly used.

The communicating terminal 30 includes a display unit 31, an operating unit 32, a PoC processing unit (communication unit, displaying unit) 33 and the like. A liquid crystal panel or the like constitutes the display unit 31, and menus, icons and the like used by the user to operate the communicating terminal 30 are displayed thereon. In the case of performing the one-to-many communication according to the PoC system, icons indicating the user participating in the communication group and the speaker, and the like, are displayed on the display unit 31. The operating unit 32 includes various buttons such as buttons through which numerals, characters and the like are inputted, buttons for displaying the menus, buttons for selecting items of the menus so as to accept a button operation by the user. The operating unit 32 includes a speaker button to be used when the one-to-many communication according to the PoC system is performed. The user pushes the speaker button to obtain the speaker's right and can speak until the pushed speaker button is released.

The PoC processing unit 33 communicates with the PoC server 10 to thereby execute processes for the one-to-many communication according to the PoC system. When the speaker button of the operating unit 32 is pushed, for example, a speaker's right obtaining request is transmitted to the PoC server 10 so that the speaker's right is obtained. After the speaker's right is obtained, the user's speech is transmitted as media data to the PoC server 10. In the present embodiment, the media data is audio data, however, the media data includes audio data and video data in the case of such a system such as a picture telephone that can transmit and receive pictures. When the pushed speaker button of the operating unit 32 is released, a speaker's right release request message is transmitted to the PoC server 10. When the media data of a speech by another user is transmitted from the PoC server 10, the transmitted media data is received and reproduced by the reproducing unit 34, and then outputted as voice to the user.

The PoC server 10 includes a network interface 11 for connection to the networks. The PoC server 10 receives the messages, media data and the like transmitted from the communicating terminal 30 and transmits the messages, media data and the like transmitted to the communicating terminal 30 by way of the network interface 11. When a speaker's right obtaining request message or a speaker's right release request message is received from the communicating terminal 30, the network interface 11 supplies the received message to a message processing unit 16. When media data is received from the communicating terminal 30, the received media data is supplied to a media transfer unit (receiving unit, transmitting unit) 12.

The message processing unit 16 determines the contents of the given message and notifies a communication group administering unit 15 or a priority/lock controller 19 of the contents of the message depending on a determination result thereby obtained. For example, when a communication group participation request message is received from a communicating terminal 30, the message processing unit 16 notifies the communication group administering unit 15 of the participation request. In the communication group administering unit 15, the communication groups and the communicating terminals 30 participating therein are associated with each other and then stored in an administering table. When the participation request is received, the communication group administering unit 15 registers the communicating terminal 30 which has transmitted the participation request message in the administering table. The communication group administering unit 15 further stores therein the priority orders appended to the respective groups.

When a speaker's right obtaining request message or a speaker's right release request message is supplied from a communicating terminal 30 to the message processing unit 16, the message processing unit 16 notifies the communication group administering unit 15 of the speaker's right obtaining request message or the speaker's right release request message. The communication group administering unit 15 checks which of the communication groups the speaker's right relating to the obtaining request or the release request belongs to, and supplies the relevant speaker's right obtaining request message or the relevant speaker's right release request message to a speaker's right administering unit (approving unit) 14.

The speaker's right administering unit 14 administrates the status of the granted or not-granted speaker's rights of the respective communication groups. When an obtaining request is received, the speaker's right administering unit 14 checks whether or not the requested speaker's right is already granted, and grants the speaker's right if not, while informing the communication group administering unit (administering unit) 15 that the speaker's right cannot be granted if so. When a release request is granted, the speaker's right administering unit 14 releases the requested speaker's right. In the case where one communicating terminal 30 is participating in a plurality of communication groups, and the speaker's right is requested from these communication groups, the speaker's right administering unit 14 notifies a media collision determining/controlling unit (determining unit, data controlling unit) 18 of the multiple requests.

When the speaker's right is successfully obtained, the communication group administering unit 15 supplies an obtaining success message to the message processing unit 16 and transmits the message to the relevant communicating terminal 30. When it failed to obtain the speaker's right, the communication group administering unit 15 supplies an obtaining failure message to the message processing unit 16 and transmits the message to the relevant communicating terminal 30. In a similar manner, a release success message or a release failure message is transmitted when the release of the speaker's right results in success or failure.

In the communicating system according to the present embodiment, wherein media data is transmitted, stored and reproduced in accordance with the priority orders of the respective communication groups, the user can temporarily lock a communication group, the media data from which he/she chooses to listen to. The communication group is locked when the user operates the operating unit 32 of the communicating terminal 30, and a lock request message is transmitted from the communicating terminal 30 to the PoC server 10. When the lock request message is received, the message processing unit 16 sends the lock request to the priority/lock controller 19. The priority/lock controller 19 determines whether or not the communication group is to be locked by each of the communicating terminals 30 and stores the locked communication group, and then notifies the media collision determining/controlling unit 18.

The media collision determining/controlling unit 18 determines whether or not media data received from a communicating terminal 30 is to be transferred to another communicating terminal, or to be stored in a media storing unit (storing unit) 17, or the like, and controls the operations of the media transfer unit 12 and the media storing unit 17 in accordance with a determination result thereby obtained. The media collision determining/controlling unit 18 is supplied with the status of the granted or not-granted speaker's rights from the speaker's right administering unit 14, information relating to the respective communication groups from the communication group administering unit 15, information on the locked communication group, if any from the priority/lock controller 19, and the like, and makes decisions based on such informations.

When the communicating terminal 30 obtains the speaker's right and transmits media data, and the network interface 11 of the PoC server 10 receives the transmitted media data, the received media data is sent to the media transfer unit 12. The operation of the media transfer unit 12 is controlled by the media collision determining/controlling unit 18, and the media transfer unit 12 generally transmits the received media data to all of the other communicating terminals 30 in the relevant communication group simultaneously.

Concerning one communicating terminal 30 participating in a plurality of communication groups when it is determined by the media collision determining/controlling unit 18 that speech are uttered at the same time from other communicating terminals 30 in the communication groups, the media collision determining/controlling unit 18 controls the media transfer unit 12 so that the media data of the speech from the highest-priority communication group is transmitted to the one communicating terminal 30. Further, the media collision determining/controlling unit 18 controls a monitor/storage controller 13 of the media transfer unit 12 so that the reception of the media data of the speech by the low-priority communication group is to be monitored, and the relevant media data, if received, is stored in the media storing unit 17.

A storage device having a large capacity, such as a hard disk or a flash memory, constitutes the media storing unit 17, and the media data received from the monitor/storage controller 13 of the media transfer unit 12 is stored therein. The media storing unit 17 stores information relating to the stored media data in a media information administering table, so that the media collision determining/controlling unit 18 determines whether or not the media data stored in the media storing unit 17 is to be transmitted referring to the media information administering table.

FIG. 3 is a schematic illustration of an example of the media information administering table. In the media information administering table, information relating to the stored media data is stored for each user participating in a plurality of communication groups. In the example illustrated in the drawing, information relating to multiple pieces of media data is associated with an unreceived user ID as a destination of transmitted media data. The information relating to the media data includes an ID of the communication group which outputted the media data, a user ID of the speaker, a starting time, an ending time and a duration of a speech, time points when the transmission of the stored media data is started, a duration of transmission, priority orders of the transmission, and an address at which the media data is stored.

In the example illustrated in the drawing, a couple of pieces of media data which have not been transmitted is stored in User 1. The first media data relates to a speech by a user 101 participating in a communication group whose ID is PoC1, which has not been transmitted to the User 1. The second media data relates to a speech by a user 102 participating in a communication group whose ID is PoC2, which is not over yet and has not been transmitted to the User 1.

The user 2 is participating in the communication group whose ID is PoC1 in the same manner as the User 1, and the media data of the speech from the User 101 is stored. However, the transmission of the media data to the User 2 already started, and the transmission of the media data for one minute of five minutes in total is currently completed. The media data stored in the media storing unit 17 is referred to at the storage address in the media information administering table, and will be deleted from the media storing unit 17 when it is no longer referred to by any user.

The media data stored in the media storing unit 17 is read under the control of the media collision determining/controlling unit 18 and supplied to the media transfer unit 12, and then, transmitted to the relevant communicating terminals 30 by the media transfer unit 12. The media collision determining/controlling unit 18 first transmits the media data of the speech from the highest-priority communication group, and then, transmits the lower-priority media data stored in the storing unit 17 after the transmission of the highest-priority media data is completed. In the case where the high-priority media data is newly received during the transmission of the stored media data, the transmission of the stored media data is interrupted, and the transmission of the highest-priority media data is started (however, the media data currently being transmitted is not necessarily interrupted, and the transmission of the highest-priority media data may wait until the transmission of the media data is completed once the transmission starts). In the case where many pieces of media data which are equally prioritized are stored, the media data is transmitted in order of speech starting time.

When the media data is stored in the media storing unit 17, the media collision determining/controlling unit 18 notifies a delay notifying unit 20 of the fact. The delay notifying unit 20 generates a delay message notifying the plurality of communicating terminals 30 participating in the communication group associated with the stored media data that the speech can be viewed or listened to with a delay and sends the generated message to the message processing unit 16. The message processing unit 16 transmits the received delay message to the relevant communicating terminals 30 simultaneously. The communicating terminals 30 which have received the delay message respectively display the occurrence of the delay on the display units 31 thereof (which will be described in detail later).

Figure 5:
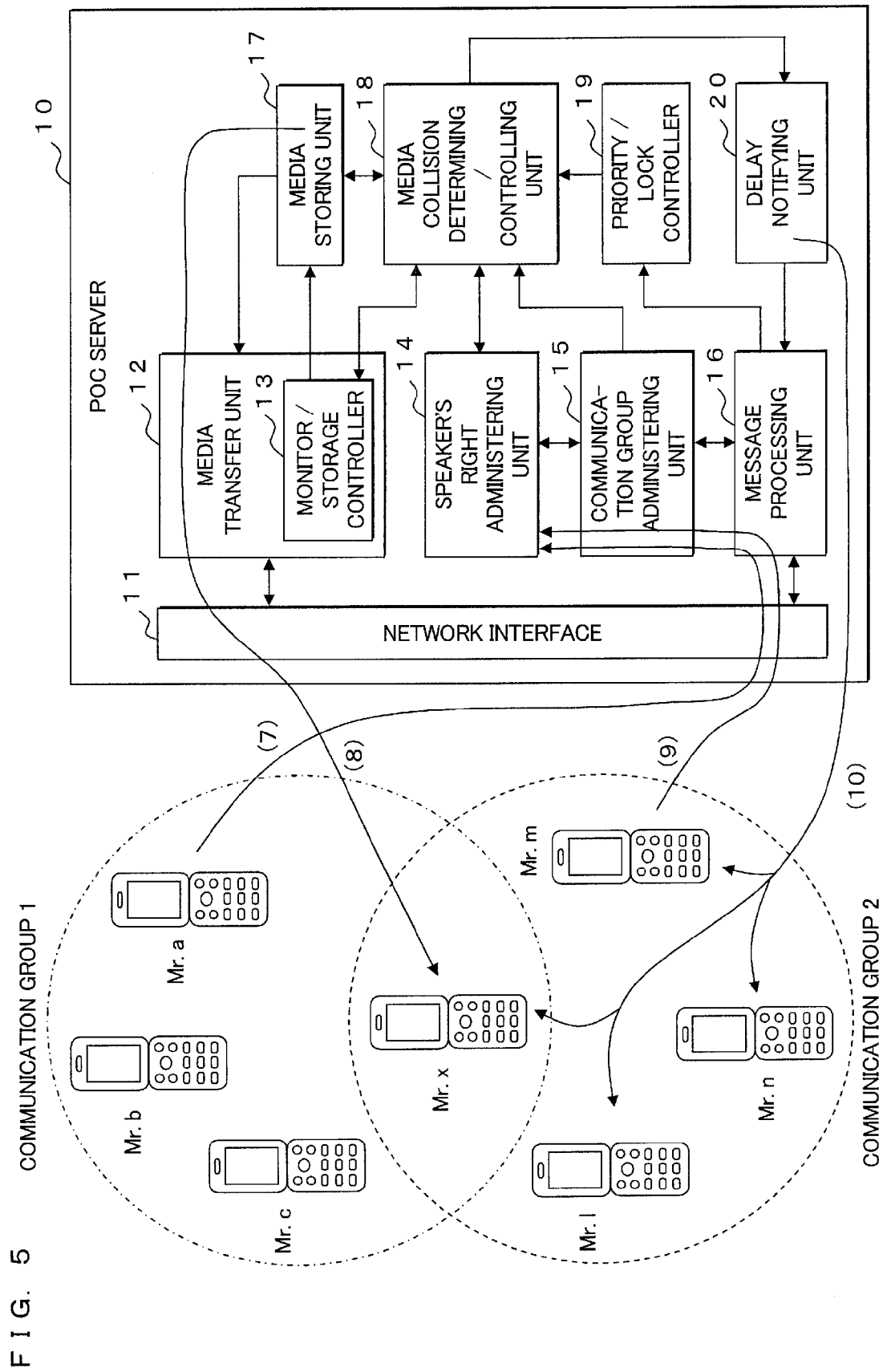
FIG. 5 is a schematic illustration of a communication example in the communicating system according to the first embodiment.

FIGS. 4 and 5 are schematic illustrations of a communication example in the communicating system according to the first embodiment. FIGS. 6 and 7 are illustrations of a display example of the display unit 31 of the communicating terminal 30 in the communication example. It is assumed that Mr. x is engaged in both of a communication group 1 in which Messrs. a, b and c participate and a communication group 2 in which Messrs. l, m and n participate, and none of the users has obtained the speaker's right. It is further assumed that the communication group 1 has a higher priority and the communication group 2 has a lower priority.

1) Mr. a requests to obtain the speaker's right: When Mr. a pushes the speaker button provided in the operating unit 32 of the communicating terminal 30, the speaker's right obtaining request message is transmitted from the communicating terminal 30 used by Mr. a to the PoC server 10, which results in an attempt to obtain the speaker's right in the speaker's right administering unit 14. At this point, the speaker's right of the communication group 1 has not been obtained by any other user. Therefore, Mr. a can obtain the speaker's right, and an obtaining success message is transmitted from the PoC server 10 to the communicating terminal 30 used by Mr. a.

2) Mr. a starts to speak: The media data of a speech by Mr. a is transmitted to the PoC server 10 and supplied to the media transfer unit 12.

3) The transmission of the media data starts: The media transfer unit 12 transmits the media data supplied thereto to the communicating terminals 30 used by the other users (Messrs. b, c and x) of the communication group 1. FIG. 6A shows the displays on the display units 31 of the respective communicating terminals 30 at the time.

On the display unit 31 of the communicating terminal 30 used by Mr. a participating only in the communication group 1, a list of the users participating in the communication group 1 is displayed, and a speaker icon 36 appended to Mr. a who has obtained the speaker's right and is now speaking is also displayed. On the display unit 31 of the communicating terminal 30 used by Mr. m participating only in the communication group 2, the speaker icon 36 is not displayed since none of the users has obtained the speaker's right, and only a list of the users participating in the communication group 2 is displayed. Because the media data of the speech by Mr. a is transmitted to the communicating terminal 30 used by Mr. x participating in the communication groups 1 and 2, the list of the users of the communication group 1 in which Mr. a is participating is displayed on his display unit 31, and the speaker icon 36 appended to Mr. a who is now speaking is displayed.

4) Mr. m requests to obtain the speaker's right: A speaker's right obtaining request message is transmitted from the communicating terminal 30 used by Mr. m to the PoC server 10, an attempt to obtain the speaker's right is made in the speaker's right administering unit 14. At this point, Mr. a has the speaker's right of the communication group 1, however, the speaker's right of the communication group 2 has not yet obtained by the other users. Therefore, Mr. m can obtain the speaker's right, and an obtaining success message is transmitted from the PoC server 10 to the communicating terminal 30 used by Mr. m. Mr. x is participating in both of the communication group 1 and the communication group 2, and the fact is informed from the speaker's right administering unit 14 to the media collision determining/controlling unit 18.

5) Mr. m starts to speak: The media data of a speech by Mr. m is transmitted to the PoC server 10, and then supplied to the media transfer unit 12. The media transfer unit 12 transmits the media data supplied thereto to the communicating terminals 30 used by Messrs. l and n (not illustrated), and stores the supplied media data to the media storing unit 17 since the highest-priority media data of the speech by Mr. a is being transmitted to Mr. x.

6) The notice of delay: The media data is stored in the media storing unit 17, and Messrs. l, m, n and x participating in the communication group 2 are notified by the delay notifying unit 20 of a delay message informing that the speech by Mr. m can be viewed or listened to with a delay. FIG. 6B shows the displays on the display units 31 of the respective communicating terminals 30 at the time.

There is no change in the status of the communication group 1 at the point, and there is no change in the display contents of the display unit 31 of the communicating terminal 30 used by Mr. a participating only in the communication group 1 alone. Since Mr. m obtained the speaker's right in the communication group 2, the speaker icon 36 appended to Mr. m is displayed on the display units 31 of the communicating terminals 30. Further, a delay message is transmitted from the PoC server 10 to the communicating terminals 30 of the communication group 2. Therefore, a delay icon 37 appended to Mr. x is displayed on the display units 31 of the respective communicating terminals 30 (except for the communicating terminal 30 used by Mr. x) of the communication group 2 which received the delay message, so that it is informed that Mr. x is not listening to the speech by Mr. m in real time. Since the media data of the speech by Mr. a of the communication group 1 is transmitted to the communicating terminal 30 used by Mr. x participating in the communication groups 1 and 2, the user list of the communication group 1 and the speaker icon 36 appended to Mr. a are continuously displayed on the display unit 31. When the delay message is received from the PoC server 10, however, the speech is being uttered by the communication group 2, and a delay icon 38 indicating that the media data of the relevant speech is stored is displayed at a lower section of the display unit 31.

7) Mr. a releases the speaker's right: When the speech by Mr. a is over and he releases the pushed speech button, the speaker's right release request message is transmitted from the communicating terminal 30 used by Mr. a to the PC server 10, and the speaker's right is released at the speaker's right administering unit 14. During the time, the media data of the speech by Mr. m is transmitted to Messrs. l and n, and also stored in the media storing unit 17.

8) The transmission of the stored data: Since the speech by Mr. a is over and the speaker's right is released, the media data of the speech by Mr. m stored in the media storing unit 17 can be transmitted to Mr. x. Then, the relevant media data is read from the media storing unit 17 and supplied to the media transfer unit 12, and then, transmitted to the communicating terminal 30 used by Mr. x. During the time, the speech by Mr. m continues, and the media data is transmitted to Messrs. l and n, and also stored in the media storing unit 17. Therefore, the speech by Mr. m which Mr. x can listen to is delayed in comparison to the speech by Mr. m which Messrs. l and n listen to. FIG. 6C shows the displays on the display units 31 of the respective communicating terminals 30.

When the speaker's right is released by Mr. a, only the user list of the communication group 1 is displayed on the display unit 31 of the communicating terminal 30 used by Mr. a participating only in the communication group 1. At this point, there is no change in the status of the communication group 2. Therefore, there is no change in the display contents of the display unit 31 of the communicating terminal 30 used by Mr. m participating only in the communication group 2.

The media data of the speech by Mr. m stored in the PoC server 10 is transmitted to the communicating terminal 30 used by Mr. x participating in the communication groups 1 and 2. Therefore, the display of the display unit 31 is switched from the user list of the communication group 1 to the user list of the communication group 2. Further, the stored media data is reproduced, and the speaker icon 36 appended to Mr. m is displayed on the display unit 31 to show that the relevant media data relates to the speech by Mr. m.

9) Mr. m releases the speaker's right: When the speech by Mr. m is over and he releases the pushed speech button, a speaker's right release request message is transmitted from the communicating terminal 30 used by Mr. m to the PoC server 10, and the speaker's right is released at the speaker's right administering unit 14. Even after the speaker's right held by Mr. m is released, the media data stored in the media storing unit 17 is continuously transmitted to Mr. x. FIG. 7D shows the displays on the display units 31 of the respective communicating terminals 30 at the time.

At this point, there is no change in the status of the communication group 1. Therefore, there is no change in the display contents of the display unit 31 of the communicating terminal 30 used by Mr. a participating only in the communication group 1. When Mr. m releases the speaker's right after his speech is over in the communication group 2, the speaker icon 36 is not displayed on the display unit 31 of the communicating terminal 30 used by Mr. m participating only in the communication group 2. However, the media data of the speech by Mr. m stored in the PoC server 10 is continuously transmitted to the communicating terminal used by Mr. x. Therefore, the delay icon 37 appended to Mr. x is continuously displayed on the display unit 31 of the communicating terminal 30 used by Mr. m, and there is no change in the display contents of the display unit 31 of the communicating terminal 30 used by Mr. x.

10) The transmission of the stored data completed: After the media data of the speech by Mr. m stored in the media storing unit 17 is completely transmitted to the communicating terminal 30 used by Mr. x, Messrs. l, m, n and x participating in the communication group 2 are notified of the completed transmission as a delay end message. FIG. 7E shows the displays on the display units 31 of the respective communicating terminals 30 at the time.

At this point, there is no change in the status of the communication group 1. Therefore, there is no change in the display contents of the display unit 31 of the communicating terminal 30 used by Mr. a participating only in the communication group 1. As a result of the transmission of the delay end message to the communicating terminals 30 participating in the communication group 2, the delay icon 37 displayed on the display unit 31 of the communicating terminal 30 used by Mr. m participating only in the communication group 2 is not displayed, and the speaker icon 36 displayed on the display unit 31 of the communicating terminal 30 used by Mr. x participating in the communication groups 1 and 2 is not displayed either. None of the users is currently speaking in the communication groups 1 and 2. Therefore, the speaker icon 36, the delay icon 37 and the like are not displayed on any of the display units 31 of the communicating terminals 30, and only the user lists of the communication groups 1 and 2 are displayed.

As illustrated in the communication example, when speeches are uttered simultaneously in a plurality of communication groups, the media data associated with a highest-priority communication group is transmitted to the communicating terminals 30 of the users participating in the plurality of communication groups, and the media data associated with a lower-priority communication group is stored in the media storing unit 17 of the PoC server 10. Accordingly the lower-priority media data can be transmitted after the transmission of the highest-priority media data is completed, and the user participating in the plurality of communication groups can listen to the simultaneously uttered speeches at different times. As a result, the user doesn not fail to listen to any important speech from the lower-priority communication group. Further, the lists of the users participating in the communication group is displayed, and the speaker icon 36, delay icons 37 and 38, and the like, are also displayed on the display units 31 of the respective users' communicating terminals 30. As a result, the users who use the respective communicating terminals 30 can easily know who is speaking, whether there is any user who is not listening to the speech in real time, and the like.

Although not described, the user who participates in a plurality of communication groups can operate the operating unit 32 of the communicating terminal 30 to thereby selectively lock a communication group speeaches of which he/she desirably listens to in real time. In such a case, the PoC server 10 transmits the media data of the speeches from the locked communication group irrespective of the priority orders appended to the respective communication groups, while storing the media data of speeches from the other communication groups in the media storing unit 17. In other words, the media data to be transmitted by the PoC server 10 is preferentially selected in the following order:

1) media data from the communication group locked by the user;
2) media data from a highest-priority communication group; and
3) media data on a speech whose starting time is earlier.

The following four timings are adopted by the PoC server 10 according to the present embodiment as timings by which media data to be transmitted to the communicating terminal 30 used by the user participating in a plurality of communication groups is switched by the PoC server 10 (or timings by which it is determined whether the media data is switched):

1) when a user obtains the speaker's right;
2) when a user releases the speaker's right;
3) when a transmission of the stored media data is completed; and
4) when a communication group is locked by a user.

However, the timings are not necessarily limited to the foregoing examples. Alternatively, for example, the media data may be switched, 5) when a silence corresponding to a certain duration time or more is detected in the media data received by the PoC server 10.

There are, of course, other timings for the data switch.

When one piece of media data of a highest-priority communication group is received while another piece of media data is being transmitted to the communicating terminal 30 used by a user participating in a plurality of communication groups, the PoC server 10 transmits the highest-priority media data over the other. When the transmission of the hightest-priority media data is completed, the transmission of the other media data which is interrupted then restarts. At the time, the reproduction of the other media data restarts in the communicating terminal 30 at any of the following points or any point other than the followings:

1) The reproduction starts at an initial point of the media data;
2) The reproduction starts at a point where the reproduction is interrupted; and
3) The reproduction starts at a point where the reproduction is interrupted in a case where the data volume of the media data is no less than a predetermined volume, while the reproduction starts at the initial point in a case where the data volume is less than the predetermined volume.

FIGS. 8 through 12 are flow charts of processing steps in the operation carried out by the PoC server 10 of the communicating system according to the first embodiment. The processing steps illustrated in these flow charts are implemented for a user participating in a plurality of communication groups. In the case where a plurality of users are engaged in a plurality of communication groups, similar processing steps are carried out for each of the users in sequence or in parallel. In the drawings and the description given below, a variable called "media number" is used. The variable is securely retained in a memory, a register or the like of the PoC server 10, and one variable is secured by each of the users participating in a plurality of communication groups. The variable "media number" is a variable which takes an integral value of at least 0, which is secured when the communicating terminal 30 is engaged in a plurality of communication groups and initialized to 0.

Figure 8:
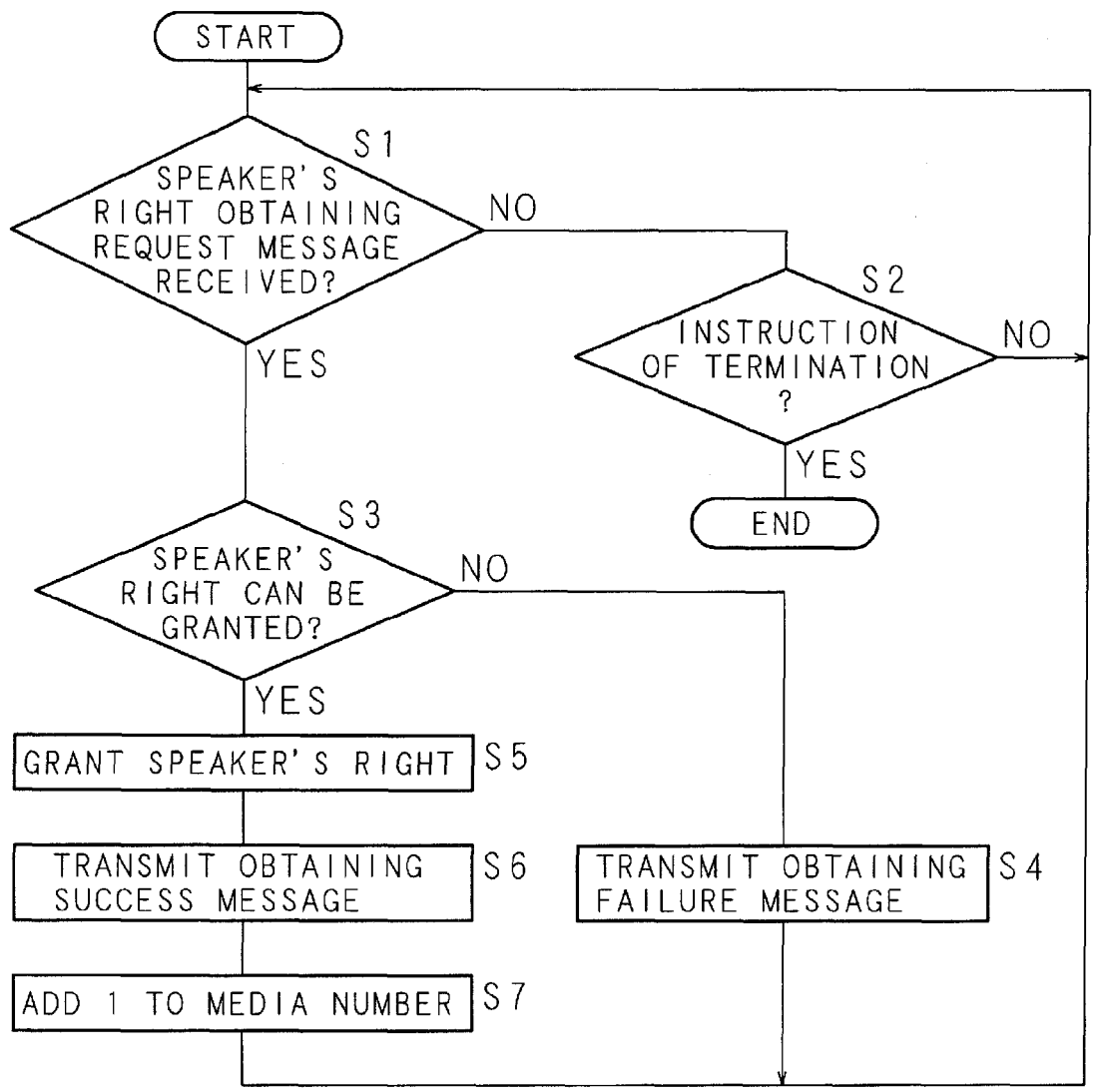
FIG. 8 is a flow chart illustrating an example of processing steps carried out by a PoC server in the communicating system according to the first embodiment.

FIG. 8 illustrates steps of granting the speaker's right to the communicating terminal 30. The PoC server 10 constantly checks whether or not a speaker's right obtaining request message is received from a communicating terminal 30 (Step S1). When it is learnt that a speaker's right obtaining request message is not received (S1: NO), it is checked whether or not the termination of one-to-many communication according to the PoC system is instructed (Step S2). When it is learnt that the termination is instructed (S2: YES), the imparting step is terminated. When it is learnt that the termination is not instructed (S2: NO), the operation returns to Step S1 so that the steps are repeated, and the POC SERVER 10 waits for the reception of an obtaining request message or an instruction to end the step.

When it is learnt that a speaker's right obtaining request message is received from the communicating terminal 30 (S1: YES), it is determined by the speaker's right administering unit 14 whether or not the speaker's right can be granted (Step S3). In the case where the speaker's right cannot be granted (S3: NO), an obtaining failure message is transmitted by the message processing unit 16 to the communicating terminal 30 which has requested to obtain the speaker's right (Step S4), and the operation returns to Step S1. In the case where the speaker's right can be granted (S3: YES), the speaker's right is granted (Step S5), and the obtaining success message is transmitted by the message processing unit 16 to the communicating terminal 30 which has requested to obtain the speaker's right (Step S6). Then, 1 is added to the variable "media number" (Step S7), and the operation returns to Step S1.

Figure 9:
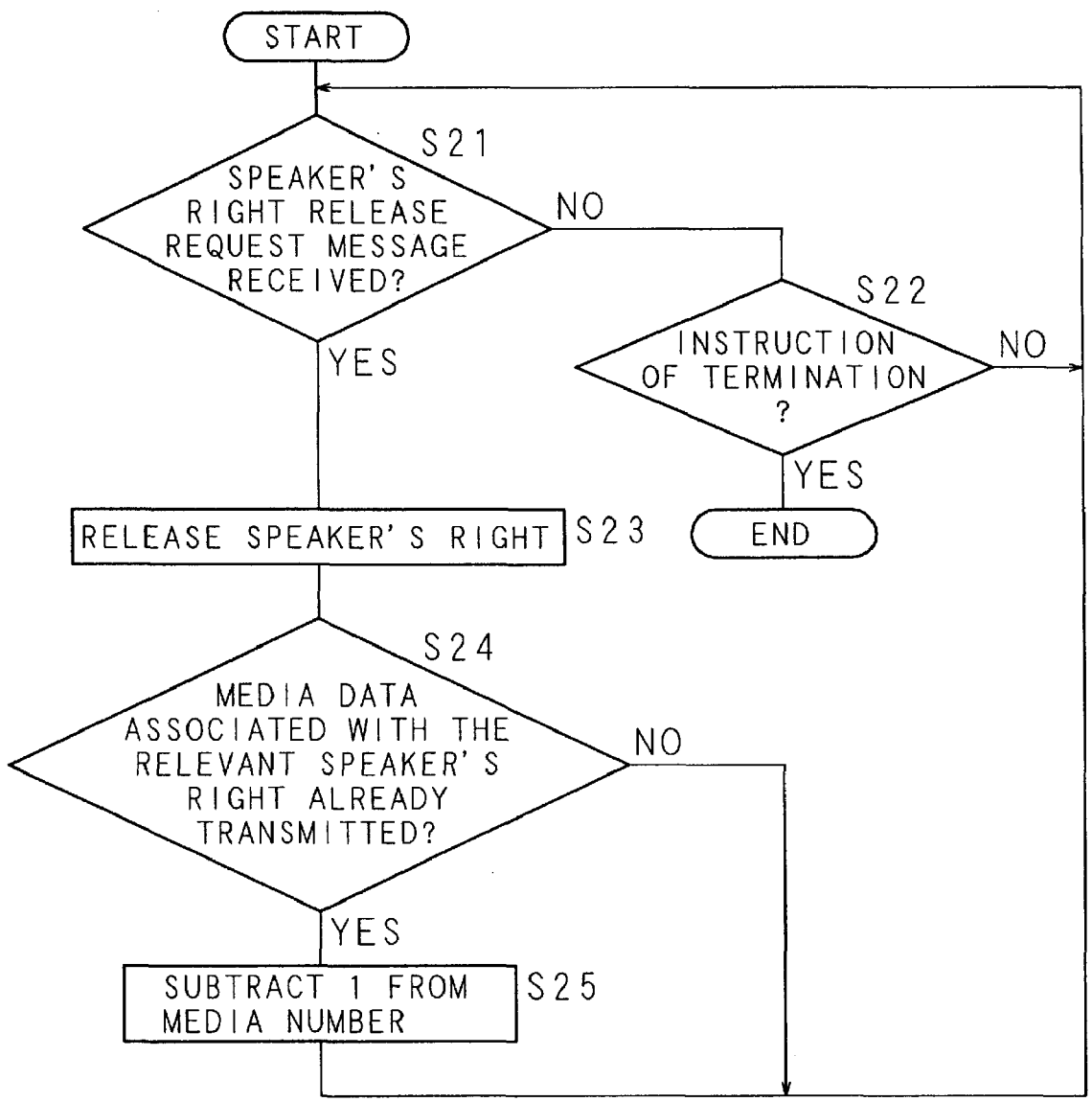
FIG. 9 is a flow chart illustrating an example of processing steps carried out by the PoC server in the communicating system according to the first embodiment.

FIG. 9 illustrates steps of releasing the speaker's right granted to the communicating terminal 30. The PoC server 10 constantly checks whether or not a speaker's right release request message is received from a communicating terminal 30 (Step S21). When it is learnt that a speaker's right release request message is not received (S21: NO), it is checked whether or not the termination of the one-to-many communication according to the PoC system is instructed (Step S22). When it is learnt that the termination is instructed (S22: YES), the releasing step is terminated. When it is learnt that the termination is not instructed (S22: NO), the operation returns to Step S21 so that these steps are repeated, and the PoC server 10 waits for the reception of a release request message or an instruction to end the step.

In the case where a speaker's right release request message is received from a communicating terminal 30 (S21: YES), the speaker's right is released at the speaker's right administering unit 14 (Step S23). Further, it is checked whether or not media data of a speech relevant to the speaker's right is transmitted in real time to a communicating terminal 30 engaged in a plurality of communication groups (Step S24). In the case where media data is transmitted in real time (S24: YES), 1 is subtracted from a variable "media number" (Step S25), and the operation returns to Step S1. In the case where media data was not transmitted in real time (S24: NO), the variable "media number" is not updated, and the operation returns to Step S1.

Figure 10:
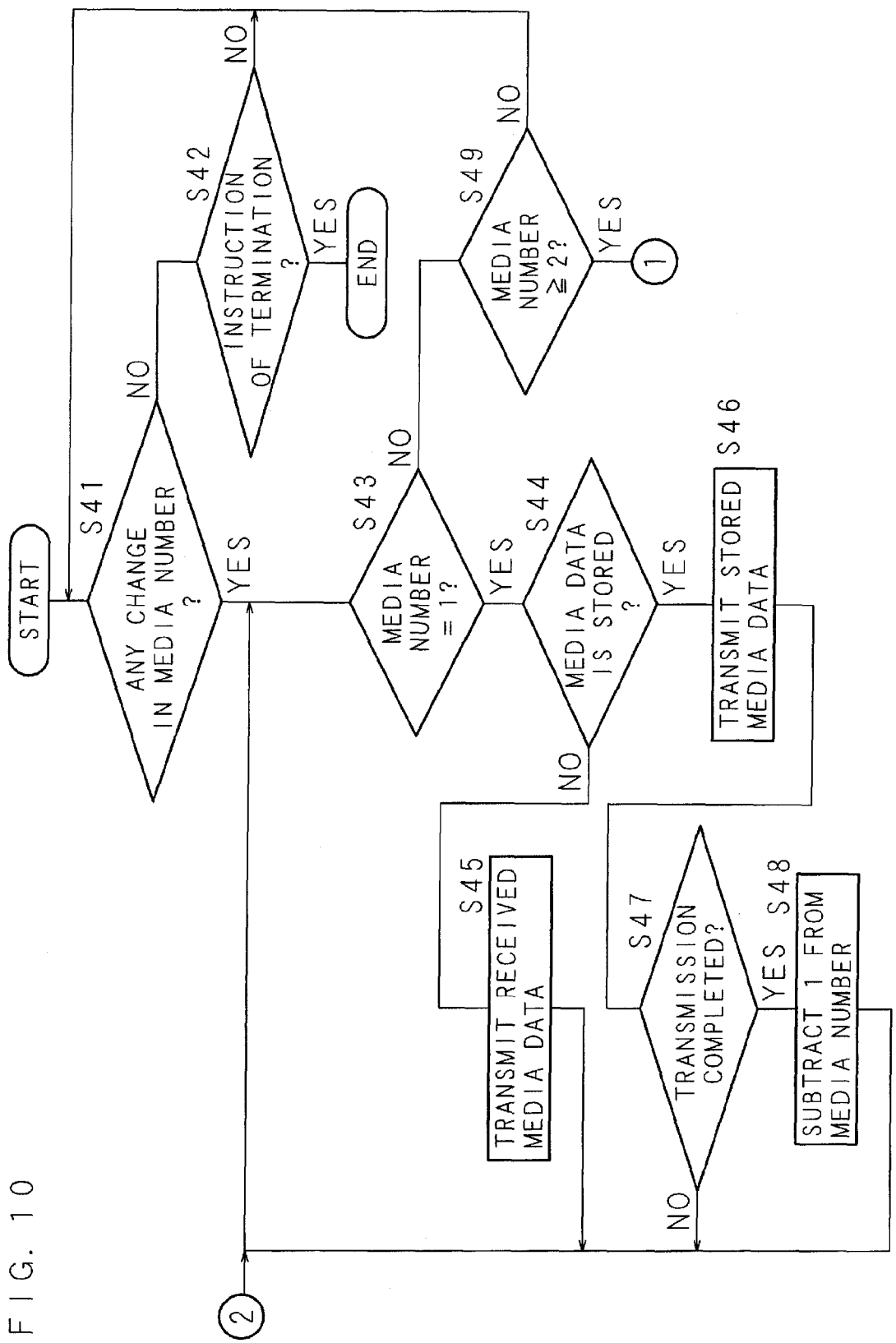
FIG. 10 is a flow chart illustrating an example of processing steps carried out by the PoC server in the communicating system according to the first embodiment.
Figure 11:
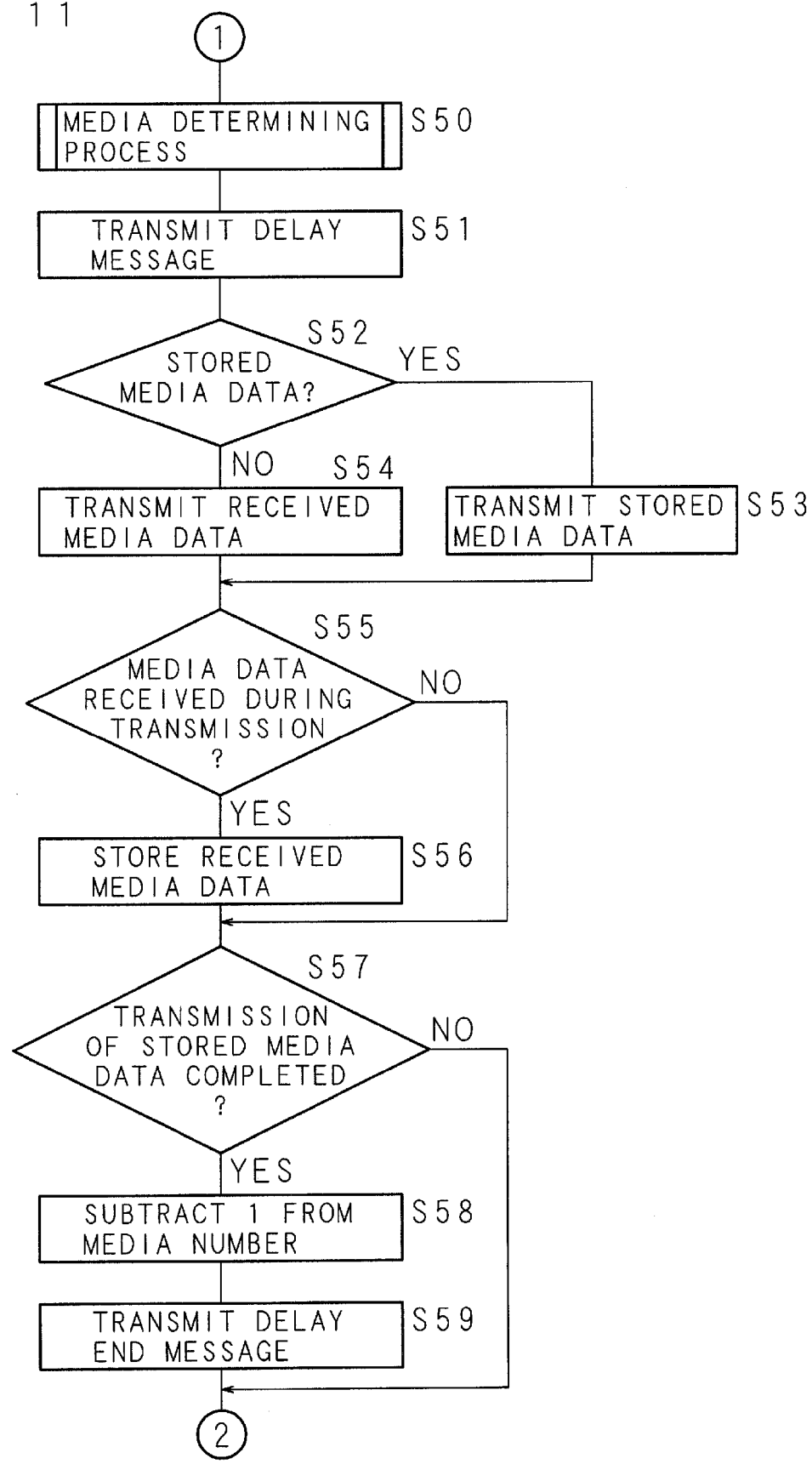
FIG. 11 is a flow chart illustrating an example of processing steps carried out by the PoC server in the communicating system according to the first embodiment.

FIGS. 10 and 11 illustrate steps transmitting the media data to a communicating terminal 30 engaged in a plurality of communication groups. The PoC server 10 constantly checks whether or not any change is generated in the variable "media number" (Step S41). When it is learnt that no change is generated in the "media number" (S41: NO), it is further checked whether or not the termination of one-to-many communication according to the PoC system is instructed (Step S42). When it is learnt that the termination is instructed (S42: YES), the transmitting step is terminated. When it is learnt that the termination is not instructed (S42: NO), the operation returns to Step S41 so that these steps are repeated, and the PoC server 10 waits for any change generated in the "media number" and an instruction to end the step.

When it is learnt that the "media number" is changed (S41: YES), it is checked whether or not the value of the "media number" is 1 (Steps S43). When it is learnt that the value of the "media number" is 1 (S43: YES), it is further checked whether or not any other media data to be transmitted is stored in the media storing unit 17 (Step S44). When it is learnt that the media data to be transmitted is not stored (S44: NO), the media data from a communicating terminal 30 which has obtained the speaker's right is received, and the received media data is transmitted by the media transfer unit 12 to a targeted communicating terminal 30 in real time (Step S45), and the operation returns to Step S43. When it is learnt that another media data to be transmitted is stored in the media storing unit 17 (Step S44: YES), the relevant media data is read, and the read media data is transmitted to a targeted communicating terminal 30 by the media transfer unit 12 (Step S46). Then, it is checked whether or not the transmission of the media data is completed (Step S47), and 1 is subtracted from the "media number" (Step S48) in the case of the completed transmission (S47: YES). Then, the operation returns to Step S43. In the case where the transmission is not completed yet (S47: NO), the "media number" is not updated, and the operation returns to Step S43. Then, the foregoing steps are repeated so that the media data is transmitted.

In the case where the value of the "media number" is not 1 in Step S43 (S43: NO), it is checked whether or not the value of the "media number" is at least 2 (Step S49). In the case where the "media number" is smaller than 2 (S49: NO), the media number" is 0 in the described example, and there is no media data to be transmitted. Then, the operation returns to Step S41. In the case where the "media number" is no less than 2 (S49: YES), there are at least two media data to be transmitted. Therefore, a media determining process for determining which of the media data is to be transmitted is implemented (S50).

Figure 12:
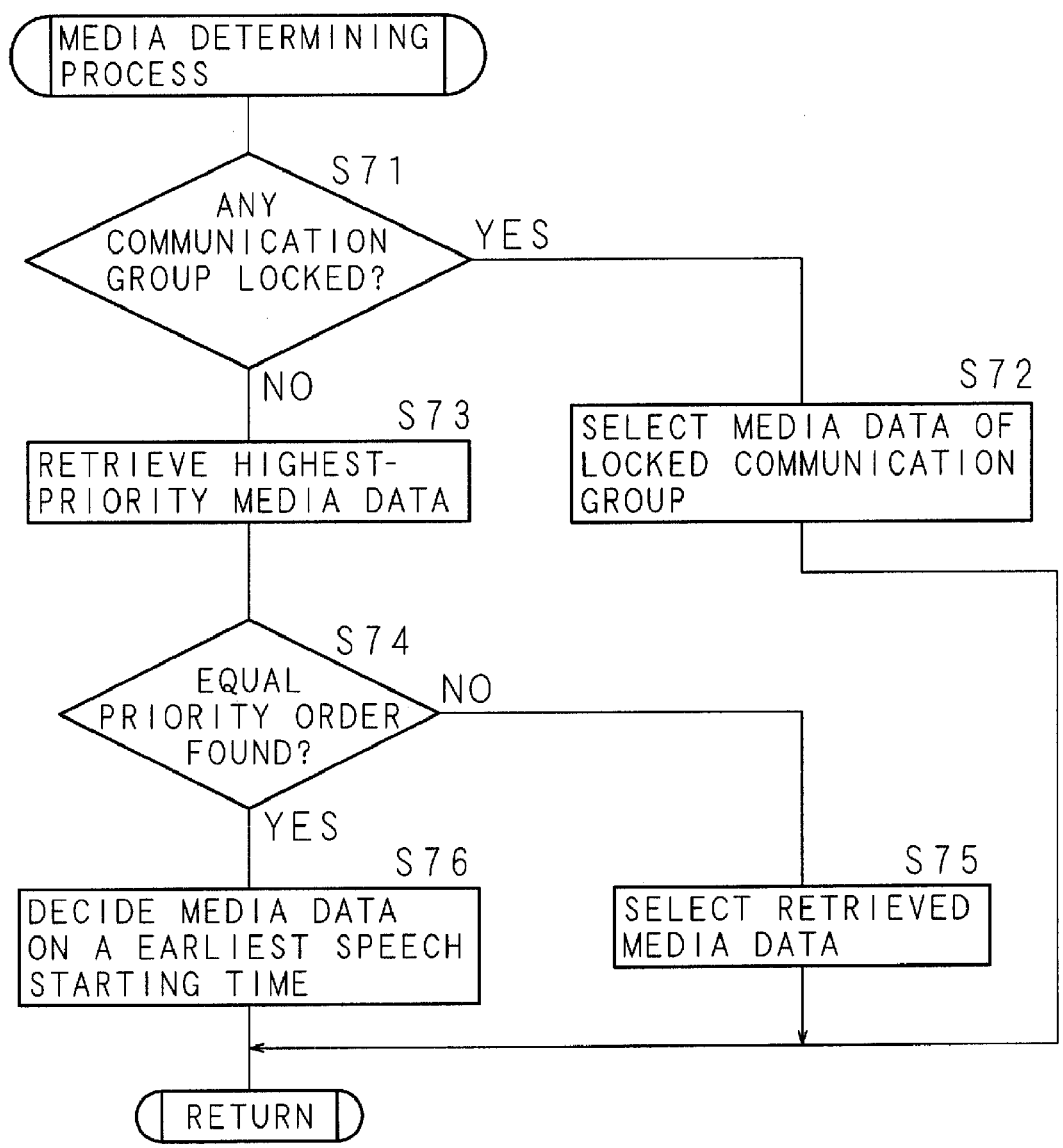
FIG. 12 is a flow chart illustrating an example of processing steps carried out by the PoC server in the communicating system according to the first embodiment.

FIG. 12 illustrates steps of the media determining process implemented in Step S50. The PoC server 10 checks whether or not any communication group is locked by a targeted communicating terminal 30 engaged in a plurality of communication groups (Step S71). In the case where a locked communication group is present (S71: YES), media data associated with the locked communication group is decided as the media data to be transmitted (Step S72). In the case where the locked communication group is not present (S71: NO), the priority orders of received media data and stored media data are checked so that the highest-priority media data is retrieved (Step S73). It is checked based on a result of the retrieval whether or not there is more than one highest-priority media data (Step S74). In the case of a single highest-priority media data (S74: NO), the only the media data obtained from the retrieval is decided as the media data to be transmitted (Step S75). In the case there are multiple pieces of highest-priority media data (S74: YES), one of these media data on a speech starting time of which is the earliest is decided as the media data to be transmitted (Step S76). After the media data to be transmitted is decided in Step S72, S75 or S76, the media determining process is terminated, and the operation returns to the transmitting step illustrated in FIGS. 10 and 11.

After the media determining process in Step S50, the media data which is not selected as the media data to be transmitted is required to be stored in the media storing unit 17. Therefore, a delay message is transmitted by the message processing unit 16 to all of the communicating terminals 30 engaged in a communication group associated with the media data to be stored (Step S51). In the case where a delay message is already transmitted, the transmission of a delay message in Step S51 is not implemented.

Next, it is checked whether or not the media data to be transmitted decided in media determining process is media data stored in the media storing unit 17 (Step S52). In the case where it is the stored media data (S52: YES), the media data stored in media storing unit 17 is read therefrom and transmitted by the media transfer unit 12 to a targeted communicating terminal 30 (Step S53). In the case where the media data to be transmitted is not stored media data (S52: NO), media data from a communicating terminal 30 which has obtained the speaker's right is received, and the received media data is transmitted by the media transfer unit 12 to the targeted communicating terminal 30 in real time (Step S54).

At the time, it is checked whether or not media data to be transmitted to the targeted communicating terminal 30 is received from any other communicating terminal 30 (Step S55). In the case where it is received (S55: YES), the received media data is stored in the media storing unit 17 (Step S56), and the operation advances to Step S57. In the case where it is not received (S55: NO), the operation advances to Step S57 without the storage of the media data.

Then, the stored media data is transmitted in Step S53, and it is checked whether or not the transmission of the media data is completed (Step S57). When it is learnt that the transmission of the stored media data is completed (S57: YES), 1 is subtracted from the value of the "media number" (Step S58), a delay end message is transmitted to all of the communicating terminals 30 to which the delay message is transmitted (Step S59), and the operation returns to Step S43. When it is learnt that the transmission of the stored media data is not completed yet (including the transmission of the received media data in Step S54)(S57: NO), the operation returns to Step S43, and the processing steps described above are repeated so that the media data is transmitted.

As described so far, in a case where there are multiple pieces of media data to be transmitted to a communicating terminals 30 engaged in a plurality of communication groups, the PoC server 10 can select one piece of the media data based on the priority orders of the communication groups, the lock setting by the user and the like and transmits the selected media data to the targeted communicating terminal 30. In the case of a communicating terminal 30 engaged in only one communication group, the PoC server 10 simply transmits received media data to the communicating terminal 30 of each user, which is not illustrated in the flow charts.

Modified Embodiment

Figure 13:
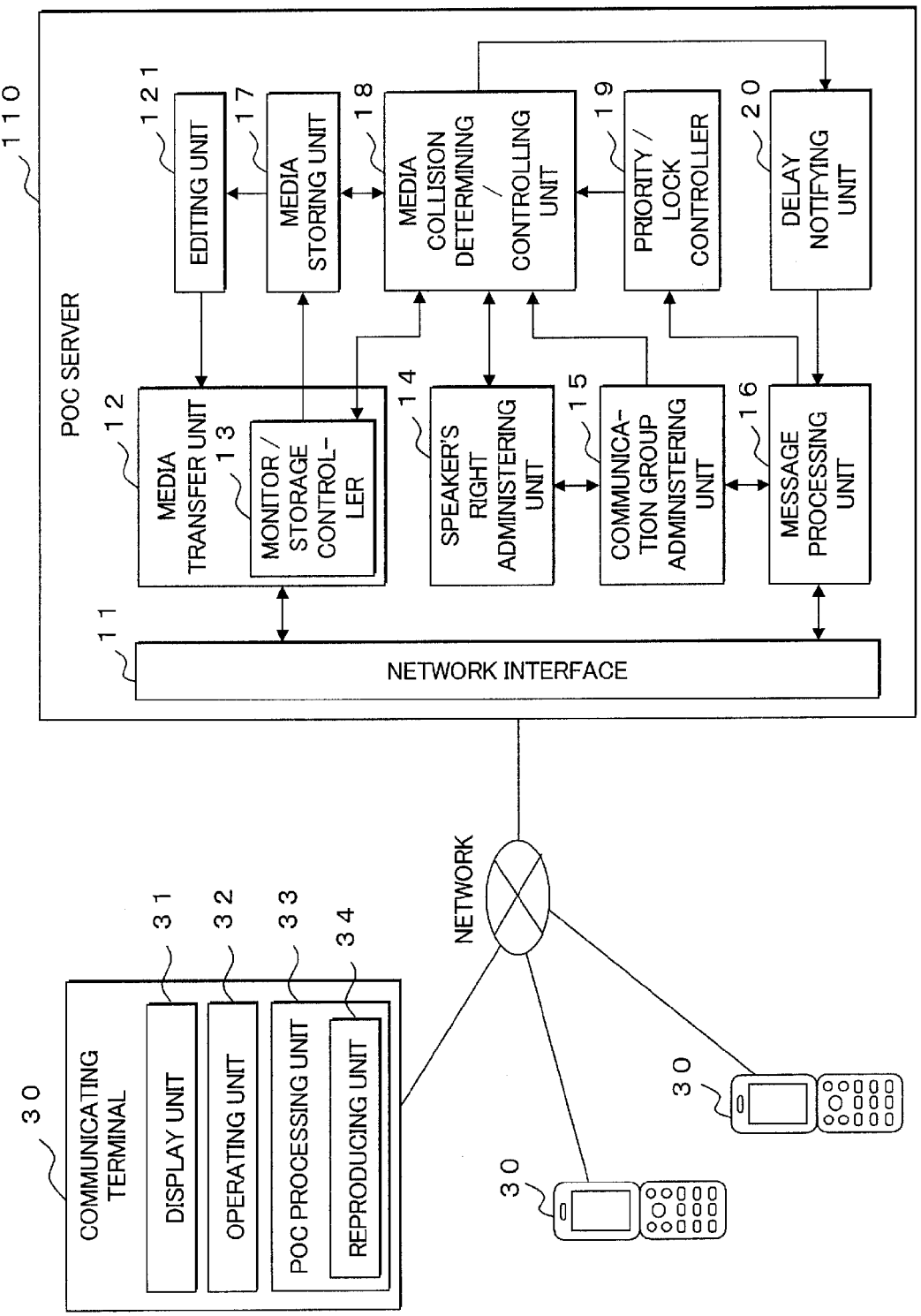
FIG. 13 is a block diagram illustrating an example of a communicating system according to a modified embodiment of the first embodiment.

FIG. 13 is a block diagram illustrating an example of a communicating system according to a modified embodiment of the first embodiment. A PoC server 110 in a communicating system according to the modified embodiment has a feature in which an editing unit 121 is additionally provided in the PoC server illustrated in FIG. 2. The editing unit 121 reads media data stored in the media storing unit 17, variously edits the read media data, and supplies the edited media data to the media transfer unit 12. Accordingly the edited media data can be transmitted to the communicating terminal 30.

In the communicating system according to the modified embodiment, a user can preset the number of the speeches which he/she can simultaneously listen to. Some users may be able to listen to two speeches at the same time, in which case the user operates the operating unit 32 of the communicating terminal 30 to thereby set the number of simultaneously audible speeches (for example, the number of simultaneously audible speeches=2 is set). The set number is sent as a message to the PoC server 110. The editing unit 121 monitors the data volume of the media data stored in the media storing unit 17. In the case where the data volume exceeds a predetermined volume, the editing unit 121 reads as many pieces of media data as the preset number of simultaneously audible speeches when the media data stored in the media storing unit 17 is transmitted, and edits these media data by superposing them into one piece of media data. However, the superposing process is not implemented to multiple pieces of media data of speeches in the same communication group. When multiple pieces of media data are thus superposed by the editing unit 121 and then transmitted to the communicating terminal 30, the user can simultaneously listen to the plurality of speeches.

In the communicating system according to the modified embodiment, the user can preset a highest possible reproducing speed of the media data. Some users may be able to listen to the speech reproduced at a double or triple speed. In such a case, the operating unit 32 of the communicating terminal 30 is operated so that the reproducing speed is set (for example, reproducing speed=double speed is set). The set speed is sent to the PoC server 110 as a message. The editing unit 121 monitors the data volume of media data stored in the media storing unit 17. In the case where the data volume exceeds a predetermined volume, the editing unit 121 edits the media data by reducing a reproducing time thereof when the media data stored in the media storing unit 17 is to be transmitted. In the case where the reproduction speed=double speed is set, for example, media data on a speech time that takes five minutes is read, and double-speed media data which can be reproduced in 2 minutes and 30 seconds is created. When the media data whose the reproducing speed is reduced by the editing unit 121 is thus transmitted to the communicating terminal 30, the user can more quickly listen to the speech of stored media data.

As for the superposition of multiple pieces of media data and the reduction of the reproducing speed of the media data, only one of them may performed, or they both may be performed. Further, the editing unit 121 may be adapted to perform a different editing process, for example, cutting a portion of the media edata corresponding to silence in the media data.

According to present embodiment, when a multiple pieces of media data from different communication groups are received, priority orders of the media data are determined, and the media data is transmitted, reproduced or the like, and stored in accordance with the determined priority orders. According to the constitution, when speeches are simultaneously uttered in the plurality of communication groups, a user can view or listen to a highest-priority speech in real time first, and lower-priority speeches afterwards. Therefore, the user can unfailingly view or listen to all of the speeches simultaneously uttered in the plurality of communication groups, and any important speech is not missed out. In the case where the media data is stored in the media storing unit 17 and has not been viewed or listened to, the fact is displayed on the communicating terminal 30. Accordingly the user who participates in the plurality of communication groups can easily determine whether or not there is media data which he/she has not viewed or listened to, and the speaker in the communication group can easily determine whether or not there is any other user who has not viewed or listened to his/her speech. Therefore, the communication among the plurality of users of the communicating system such as the PoC system, can be smoothly performed. Moreover, in a case where the data volume of the media data stored in the media storing unit 17 exceeds a predetermined volume, data editing to reduce a reproducing time and to superpose multiple pieces of media data, for example, is peformed so that the limited capacity of the storing unit may be effectively used, and any significant delay in viewing or listening the media data by the users in the communication group can be prevented.

Embodiment 2

The communicating system according to the first embodiment is constituted such that the PoC server 10 selects the media data which a user engaged in a plurality of communication groups wishes to listen to in accordance with the priority orders or the like. However, the communicating system may be constituted such that the respective communicating terminals 30 are responsible for this operation. FIG. 14 is a block diagram illustrating an example of a communicating system according to a second embodiment. In a PoC server 310 in the communicating system according to the second embodiment, messages from a communicating terminal 330 received by a network interface 311, such as a participation request message and a speaker's right obtaining request message and a release request message, are supplied to a message processing unit 316, and the communication groups are administrated by a communication group administering unit (administering unit) 315 based on these messages, and grant, release or the like of the speaker's right is administrated by a speaker's right administering unit (approving unit) 314. These processes, which are similar to those of the PoC server 10 of the communicating system according to the first embodiment, will not be described in detail.

In the PoC server 310, when media data is received from the communicating terminal 330 which has obtained the speaker's right, the media data is supplied to the media transfer unit (receiving unit, transmitting unit) 312. The media transfer unit 312 transmits the supplied media data simultaneously to all of the other communicating terminals 330 engaged in the communication group associated with the communicating terminal 330 which has originally transmitted the media data.

The communicating terminal 330 in the communicating system according to the second embodiment includes, in a PoC processing unit (communication unit, displaying unit) 333, a reproducing unit 334, a monitor/storage controller 335, a speaker's right administering unit 336, a communication group administering unit 337, a message processing unit 338, a network interface 339, a media storing unit (storing unit) 340, a media collision determining/controlling unit (determining unit, data controlling unit) 341, a priority/lock controller 342, and the like. In the communicating terminal 330 engaged in only one communication group, only one piece of media data is received at a time from the PoC server 310. Therefore, when the media data is received by the interface network 339, the received media data is supplied to the reproducing unit 334 and reproduced therein, and then outputted as voice to the user.

In contrast, in a communicating terminal 330 engaged in a plurality of communication groups, multiple pieces of media data are transmitted from the PoC server 310 when speeches are simultaneously uttered by the different communication groups. When multiple pieces of media data are received, one piece of the media data is reproduced in the reproducing unit 334, while the rest of the media data is stored in the media storing unit 340 by the monitor/storage controller 335 of the reproducing unit 334. The media data to be reproduced or stored is selected by the media collision determining/controlling unit 341 depending on whether or not there is any communication group locked by the user, priority orders appended to the communication groups associated with the respective media data, speech starting time of each media data, and the like, in a manner similar to the first embodiment.

Therefore, the communicating terminal 330 is provided with the priority/lock controller 342 which accepts a lock instruction from the user by way of the operating unit 32, speaker's right administering unit 336 for administering the information on the speaker's rights associated with the communication groups, communication group administering unit 337 for administering the priority orders of the respective communication groups, information on the users, and the like. In the speaker's right administering unit 336 and the communication group administering unit 337 of the communicating terminal 330, a portion of the information (only the information of the communication group in which the communicating terminal 330 is engaged) administrated by the speaker's right administering unit 314 and the communication group administering unit 315 of the PoC server 310 is duplicated and stored. Every time the information is updated in the PoC server 310, it is sent to the message processing unit 338 of the communicating terminal 330 from the message processing unit 316 of the PoC server 310 as a message, and supplied to the speaker's right administering unit 336 or the communication group administering unit 337.

Because the communicating terminal 330 is thus provided with the monitor/storage controller 335, speaker's right administering unit 336, communication group administering unit 337, media storing unit 340, media collision determining/controlling unit 341, priority/lock controller 342, and the like, the communicating terminal 330 per se can perform the precessing (processing steps illustrated in the flow charts of FIGS. 10 to 12) such as selection, storage and the like of media data which are carried out by the PoC server 10 according to the first embodiment. It is noted that the PoC server 10 according to the first embodiment selects whether the media data should be transmitted or stored in accordance with the priority orders of the communication groups, however, the communicating terminal 330 according to the second embodiment selects whether the media data should be reproduced or stored in accordance with the priority orders of the communication groups. The PoC server 10 according to the first embodiment is adapted to transmit a delay message by way of the delay notifying unit 20, however, the communicating terminal 330 does not require this feature. In place of the feature, the media collision determining/controlling unit 341 displays an icon which notifies the display unit 31 of a generated delay (see FIGS. 6 and 7).

In the communicating system according to the second embodiment, when speeches are simultaneously uttered in a plurality of communication groups, the PoC server 310 simply transmits the media data of the speeches simultaneously to a plurality of communicating terminals 330 engaged in the respective communication groups, and the media data is reproduced or stored in the communicating terminal 330 which receives the media data in accordance with the priority orders of the communication groups. Even in this case, according to the constitution, the user can listen to lower-priority media data after highest-priority media data with the communicating terminal 330 engaged in the plurality of communication groups in a manner similar to the communicating system according to the first embodiment 1 wherein the PoC server 10 transmits or stores the media data depending on the priority orders of the communication groups. Therefore, the user does not fail to listen to speeches simultaneously uttered in a plurality of communication groups. In the case where these processes are executed in the communicating terminal 330, an application software program for executing these processes may be stored in the PoC server 310 to be downloaded from the PoC server 310 into the communicating terminal 330 and then executed. Further, the communicating terminal 330 may include a functional block adapted to have a feature similar to that of the editing unit 121 provided in the PoC server 110 described in the modified embodiment of the first embodiment (see FIG. 13).

What is claimed is:

1. A communication system comprising:
a plurality of communication terminals each of which includes:
   a communication unit that transmits and receives voice data; and
   a reproduction unit that reproduces the voice data received by the communication unit; and
a server which includes:
   an administering unit that administers the plurality of communication terminals based on each communication group;
   an approving unit that approves the transmission of the voice data by one communication terminal in a predetermined communication group among the plurality of communication terminals;
   a receiving unit that receives the voice data transmitted by the one communication terminal; and
   a transmitting unit that transmits the voice data received by the receiving unit to plural communicating terminals in another communication group;
wherein the one communicating terminal can be engaged in said another and other communication groups, and the communicating system further comprises:
a determining unit, in a case where the receiving unit simultaneously receives voice data to be reproduced in the predetermined communication group and voice data to be reproduced in said another communication group, that determines priority orders of the voice data to be reproduced in the predetermined communication group and the voice data to be reproduced in said another communication group;
a storing unit for storing the voice data whose priority is determined to be lower by the determining unit; and
a data controlling unit that processes the voice data whose priority is determined to be lower by the determining unit after the voice data whose priority is determined to be higher by the determining unit is processed.

2. The communication system according to claim 1, wherein the server comprises the determining unit, the storing unit and the data controlling unit, and the determining unit determines priority orders of multiple pieces of data to be transmitted when the multiple pieces of data to be transmitted to the communication terminal engaged in a plurality of communication groups are received by the receiving unit, and the data controlling unit transmits the data having a highest priority to the communication terminal using the transmitting unit in accordance with a determination result obtained by the determining unit, stores data having a lower priority in the storing unit, and transmits the data having the lower priority after the data having the highest priority is transmitted.

3. The communication system according to claim 1, wherein the communication terminal comprises the determining unit, the storing unit and the data controlling unit, and the determining unit determines priority orders of multiple pieces of data to be reproduced when the multiple pieces of data associated with the different communication groups are received, and the data controlling unit reproduces data having a highest priority using the reproduction unit in accordance with determination result obtained by the determining unit, stores the data having a lower priority in the storing unit, and reproduces the data having the lower priority after the data having the highest priority is reproduced.

4. The communication system according to claim 1, wherein the communication terminals each comprises: a display unit for displaying an image; and a displaying unit that displays that the data is stored, on the display unit in the communication terminal of the communication group associated with the stored data, when the data controlling unit stores the data in the storing unit.

5. The communication system according to claim 1, further comprising an editing unit that edits data for reducing a reproducing time of data or superposing multiple pieces of data in a case where a data volume of the data stored in the storing unit exceeds a predetermined volume.

6. A server comprising:

an administering unit that administers a plurality of communication terminals based on each communication group;

an approving unit for approving transmission of voice data by one communication terminal in a predetermined communication group among the plurality of communication terminals;

a receiving unit that receives the voice data transmitted by the one communication terminal; and a transmitting unit for transmitting the voice data received by the receiving unit plural communicating terminals in another communication group;

wherein the one communicating terminal can be engaged in said another and other communication groups, and the server further comprises:

a determining unit, in a case where the receiving unit simultaneously receives voice data to be transmitted in the predetermined communication group and voice data to be transmitted to said another communication group, that determines priority orders of the voice data to be transmitted to the predetermined communication group and the voice data to be transmitted to said another communication group;

a storing unit that stores the voice data whose priority is determined to be lower by the determining unit; and a data controlling unit that transmits the voice data whose priority is determined to be lower by the determining unit after the voice data whose priority is determined to be higher by the determining unit is transmitted.

7. The server according to claim 6, further comprising an editing unit that edits the data for reducing a reproducing time of the data or superposing multiple pieces of data in a case where a data volume of the data stored in the storing unit exceeds a predetermined volume.

8. A communicating terminal comprising:

a communication unit that transmits voice data to a server when a communication terminal is engaged in a communication group which transmits and receives the data by way of the server among a plurality of devices for transmitting data when the transmission is approved by the server and receives the data transmitted from the server; and a reproduction unit that reproduces voice data received by the communication unit, wherein the communication terminal can be engaged in a plurality of communication groups, and the communication terminal further comprises:

a determining unit, in a case where the receiving unit simultaneously receives voice data to be reproduced in the predetermined communication group and voice data to be reproduced in said another communication group, that determines priority orders of the voice data to be reproduced in the predetermined communication group and the voice data to be reproduced in said another communication group;

a storing unit that stores voice data whose priority is determined to be lower by the determining unit; and a data controlling unit that reproduces voice data whose priority is determined to be lower by the determining unit after the voice data whose priority is determined to be higher by the determining unit is reproduced.

9. The communication terminal according to claim 8, further comprising:

a display unit that displays an image; and a displaying unit that displays that the data is stored on the display unit when the data controlling unit stores the data in the storing unit.

10. The communication terminal according to claim 8, further comprising an editing unit that edits data for reducing a reproducing time of data or superposing multiple pieces of data in a case where a data volume of the data stored in the storing unit exceeds a predetermined volume.

11. A non-transitory recording medium capable of being read by a server in which a program for making the server execute administering a plurality of communication terminals as a communication group is recorded, said program comprising:

determining, in case where voice data to be transmitted to a predetermined communication group and voice data to be transmitted to another communication are simultaneously received, priority orders of the voice data to be transmitted in the predetermined communication group and the voice data to be transmitted in said another communication group;

storing the voice data whose priority is determined to be lower; and processing the voice data whose priority is determined to be lower after the voice data whose priority is determined to be higher is processed.

12. A non-transitory recording medium capable of being read by a communication terminal in which a program for making the communication terminal execute participating in a communication group is recorded, said program comprising:

participating in a plurality of communication terminal groups;

determining, in case where voice data to be reproduced to a predetermined communication group and voice data to be reproduced to another communication are simultaneously received, priority orders of the voice data to be reproduced in the predetermined communication group and the voice data to be reproduced in said another communication group;

storing the voice data whose priority is determined to be lower; and processing the voice data whose priority is determined to be lower after the voice data whose priority is determined to be higher is processed.

* * * * *